Dec. 22, 1953  B. E. ROCKHOFF ET AL  2,663,204
MACHINE FOR MAKING FRAMES
Filed Oct. 24, 1947  6 Sheets-Sheet 1

INVENTORS
BERT E. ROCKHOFF
BY  JOSEPH MAYER
Whittemore, Hulbert
& Belknap
ATTORNEYS

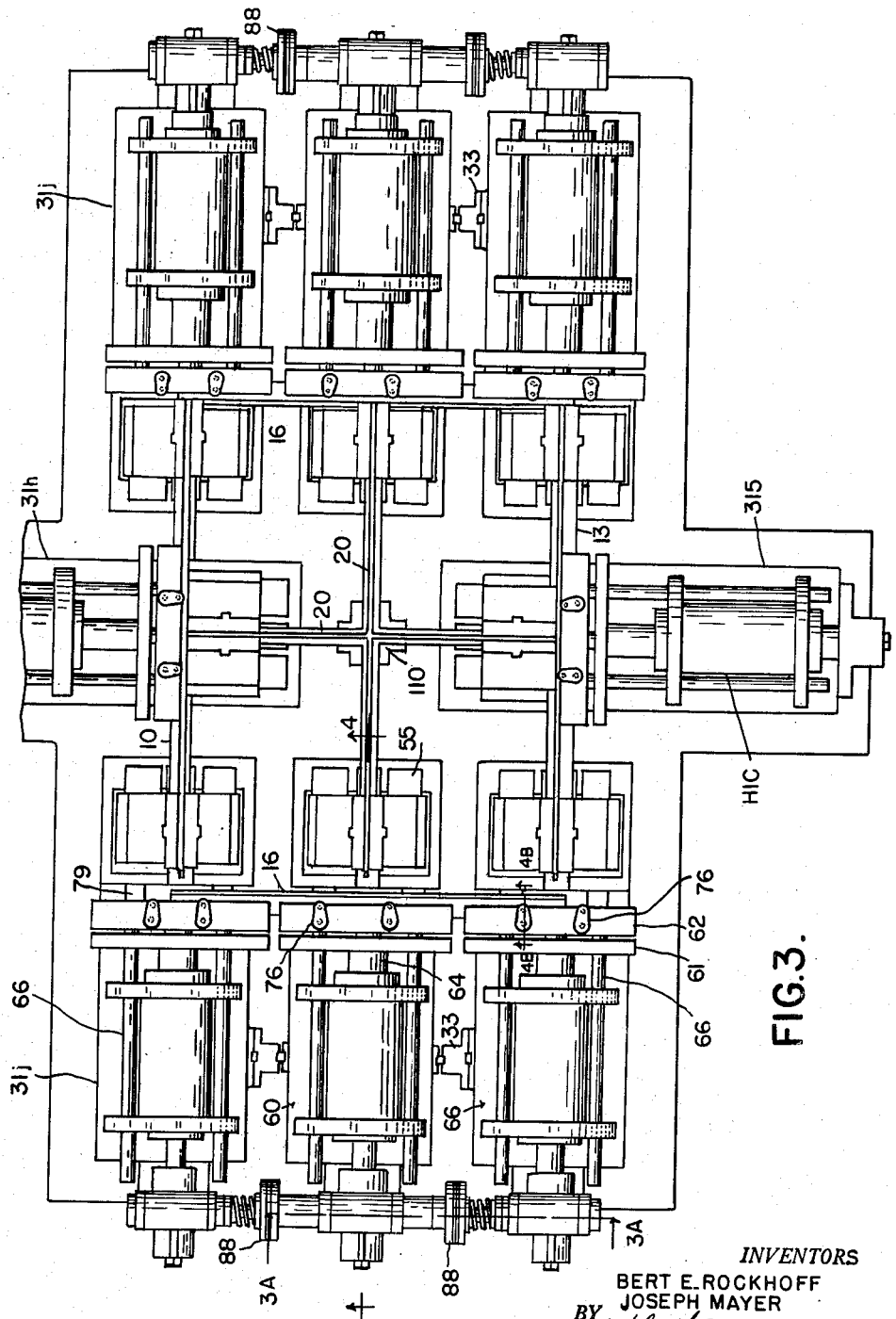

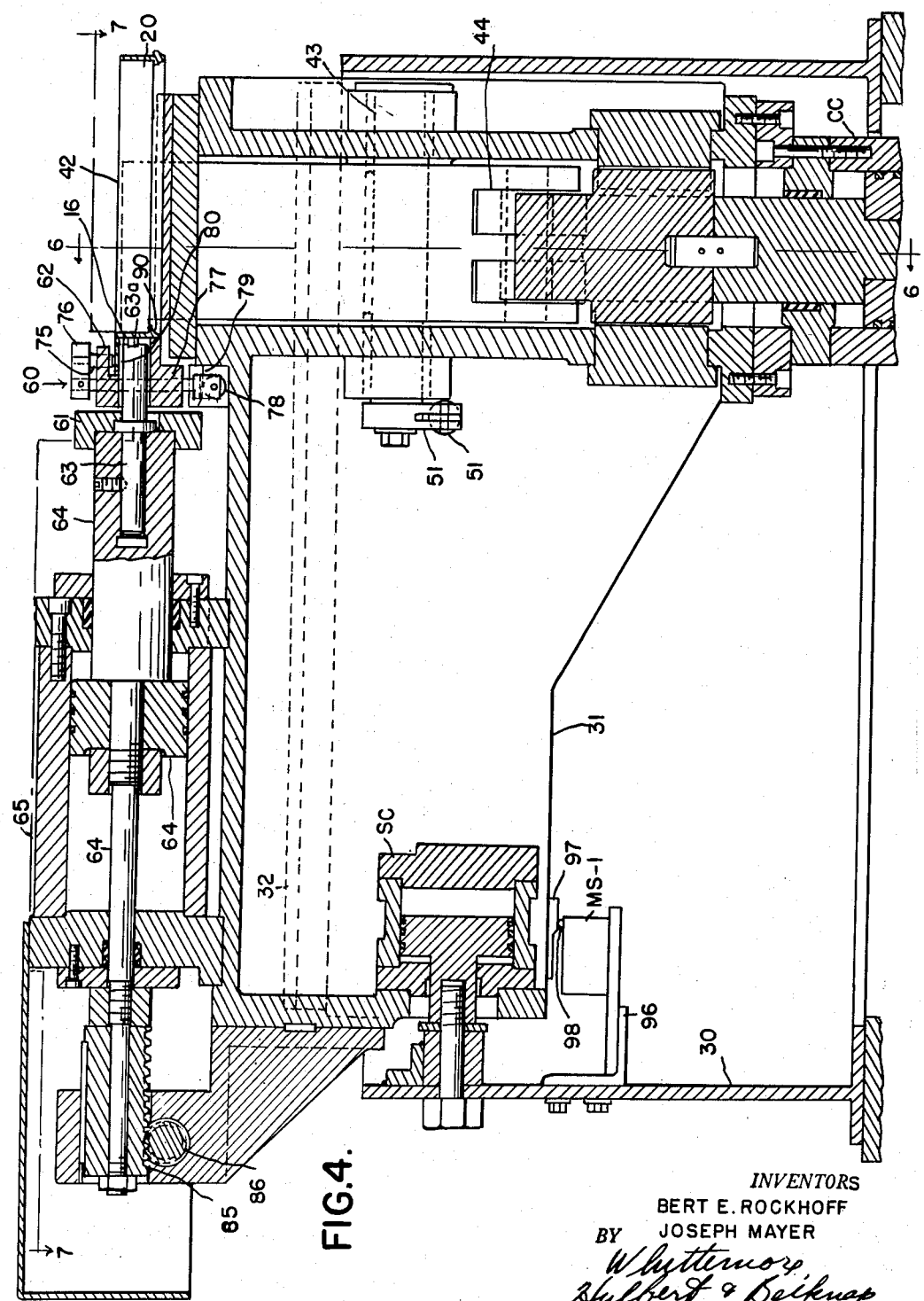

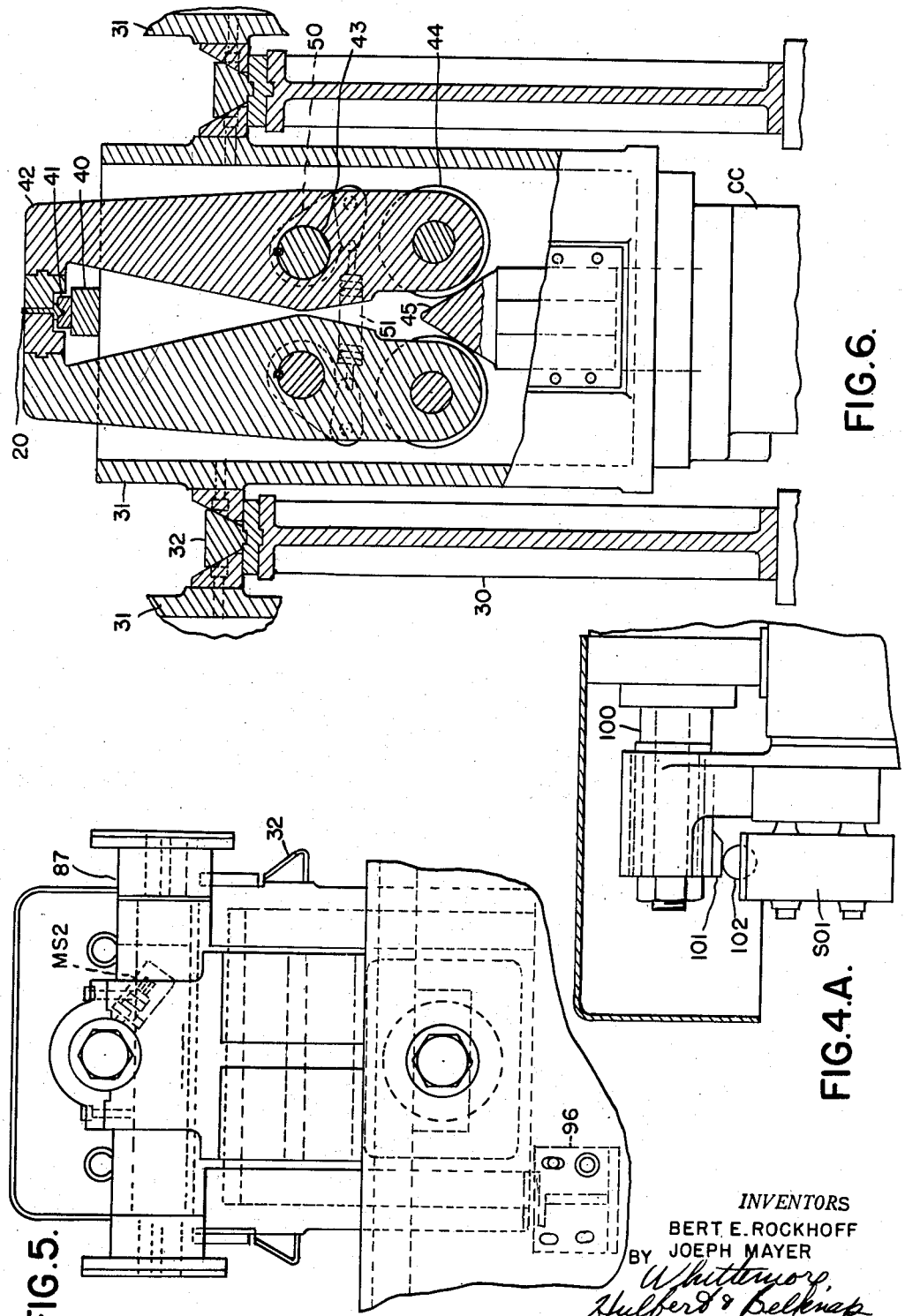

Dec. 22, 1953　　B. E. ROCKHOFF ET AL　　2,663,204
MACHINE FOR MAKING FRAMES
Filed Oct. 24, 1947　　6 Sheets-Sheet 5
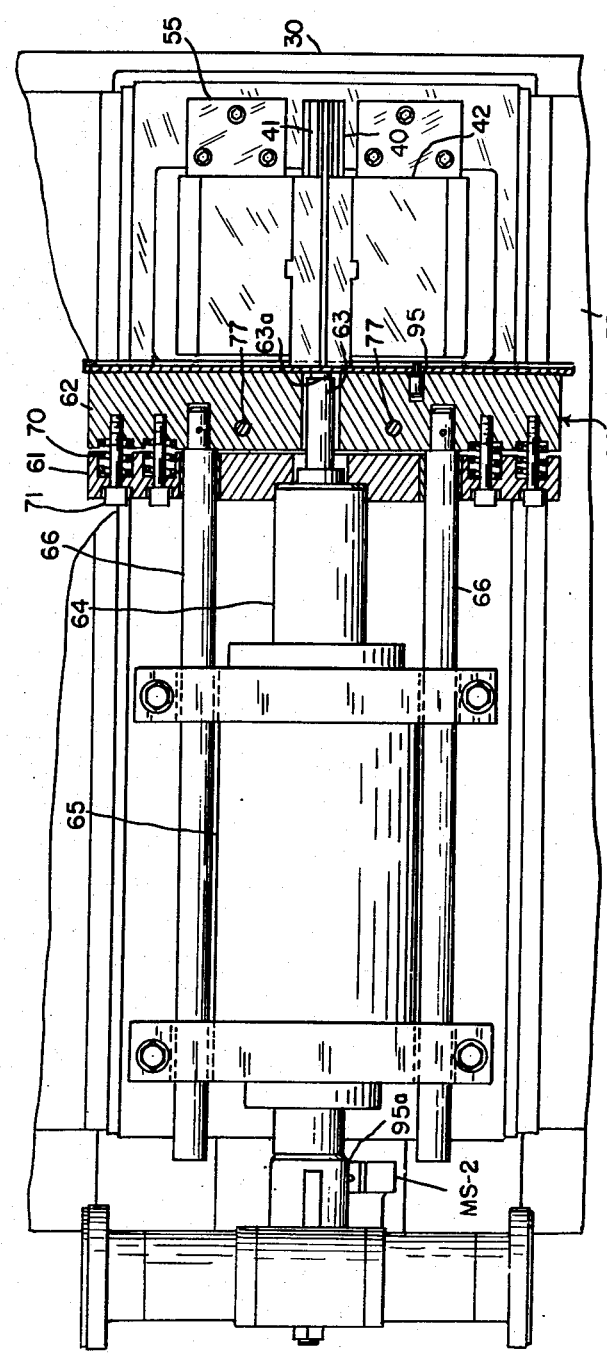
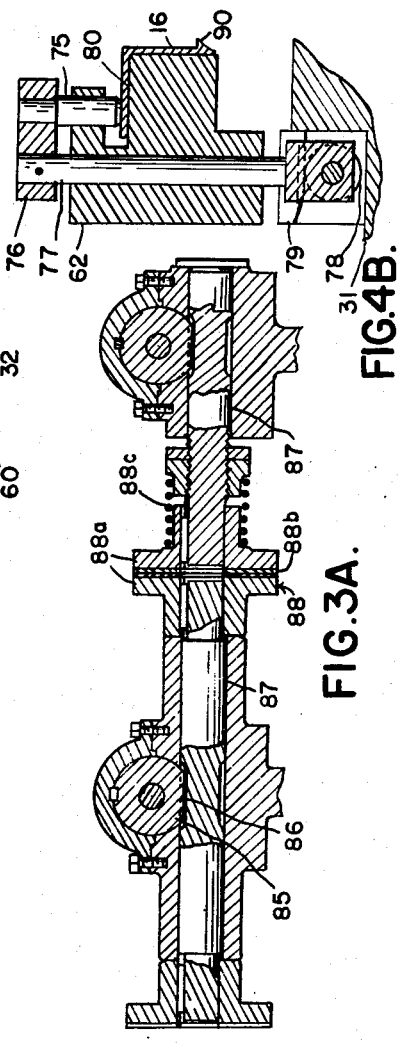
INVENTORS
BERT E. ROCKHOFF
JOSEPH MAYER
BY
Whittemore,
Hulbert & Belknap
ATTORNEYS

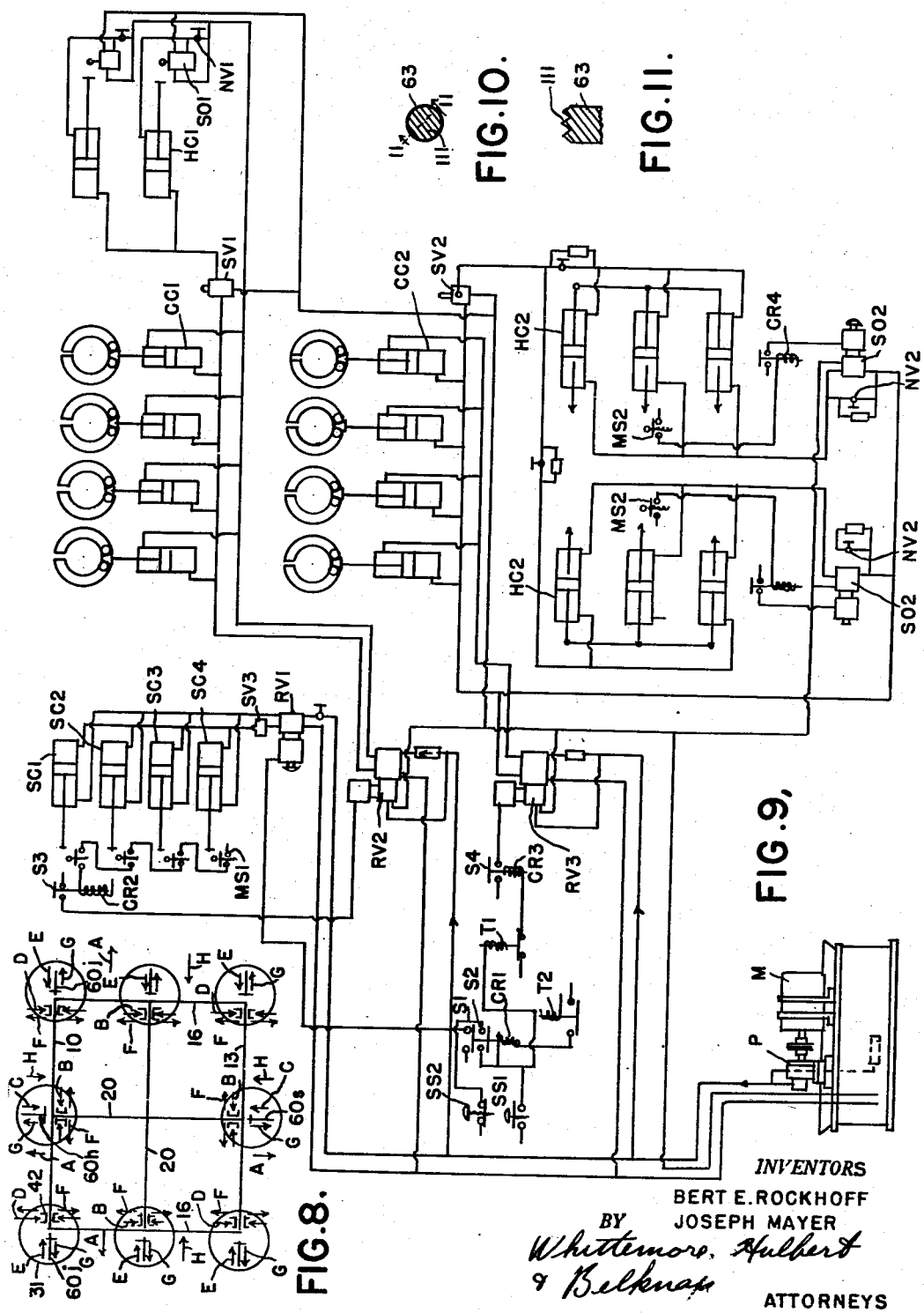

Patented Dec. 22, 1953

2,663,204

UNITED STATES PATENT OFFICE 2,663,204

MACHINE FOR MAKING FRAMES

Bert E. Rockhoff, Grosse Pointe Farms, and Joseph Mayer, Detroit, Mich., assignors to Detroit Steel Products Company, Detroit, Mich., a corporation of Michigan Application October 24, 1947, Serial No. 781,984

20 Claims. (Cl. 78—49)

The present invention relates to apparatus for making frames and more particularly to apparatus effective to assemble a plurality of bars and to effect secure attachment between the bars.

The machine is useful in the manufacture of window frames, ventilator frames and the like and may be employed in manufacturing frames having four outer frame bars in conjunction with one or more interior bars, such for example as muntins on windows. The interior bars may be arranged in various patterns, such for example as crosses.

Briefly described, the machine is designed to operate on bars some of which are provided with projecting tenons at their ends and others of which are provided with tenon-receiving openings or slots either adjacent their ends or intermediate their ends in accordance with the particular pattern of the frame. The machine is designed to permit the operator to place the bars to be assembled in the machine, after which the operator presses a starting button. Thereafter the machine goes through a complete cycle which is terminated when the frame is completely assembled ready for removal. During the cycle of the machine bars having tenons at their ends are engaged by clamping jaws adjacent the tenon ends which locate the bars in exactly predetermined position and support the ends of the bars for a subsequent tenon-upsetting operation. Bars having openings or slots to engage with the tenons are advanced toward the tenon bars and as they are advanced they are clamped by automatic clamping or holddown means, which has the effect of accurately locating the slots in the bars in registry with the tenons. The outer frame bars are initially positioned in the machine over locating pins which prevent longitudinal displacement of the bars during subsequent operations. The slotted bars are advanced so that the tenons of the tenon bars pass through the slots and protrude therefrom. Pressure means are provided for pressing the slotted bars firmly against the tenon ends of the tenon bars and while thus held ram or chisel means are advanced against the protruding ends of the tenons, sufficient pressure being supplied to upset the tenon ends to provide a firm rigid interconnection.

With the foregoing general description of the operation of the apparatus in mind, it is an object of the present invention to provide apparatus for assembling and permanently interconnecting bar elements to produce a frame.

It is a further object of the present invention to provide apparatus for assembling a plurality of bars some of which are provided with tenons at their ends and others of which are provided with slots for receiving the tenons, the apparatus being effective to interfit the tenon and slots and thereafter to upset the protruding ends of the tenons.

It is a further object of the present invention to provide in a machine for assembling frames from bar elements, some of which are provided with tenons at their ends and others of which are provided with slots for receiving the tenons, means for supporting the tenon ends of the tenon bars directly adjacent the tenon ends thereof in combination with ram means for upsetting the tenon ends after insertion through corresponding slots in adjacent bar elements.

It is a further object of the present invention to provide fully automatic apparatus for receiving a plurality of bars provided with cooperating tenons and slots which is effective to assemble the bars with the tenons projecting through the slots, to retain the bars in tightly assembled relationship and thereafter for upsetting the tenon ends to provide a permanent interconnection between bars.

It is a further object of the present invention to provide apparatus for assembling a plurality of bars some of which are provided with tenon ends and some of which are provided with tenon-receiving slots into a frame structure, the bars having laterally projecting flanges or rebates, the apparatus including means for gripping bars which have tenons at their ends closely adjacent to the ends thereof and means for effecting relative movement between the bars and gripping elements so that the gripping elements engage the web portions of the bars in a position overlying laterally projecting flanges or rebates, and upon completion of the assembling operation, a second relative motion between the gripping elements and bars clears laterally projecting portions of the bar elements from the gripping elements to permit removal of the assembled frame.

It is a further object of the present invention to provide apparatus for assembling and rigidly securing together bar elements into a frame structure which comprises means for clamping tenon ends of bar elements, means for assembling slotted portions of bar elements over the tenon ends, means for upsetting protruding portions of tenons, hydraulic means for effecting the operations above recited and automatically operable means to control pressure in the hydraulic system effective to effect clamping and upsetting so that a maximum pressure is available to hold the tenon ends of tenon bars against longitudinal movement and to effect the upsetting operation of protruding portions of tenons.

Other objects and features of the invention will become apparent as the description proceeds, especially when taken in conjunction with the accompanying drawings, wherein:

Figure 3 is a plan view of the apparatus illustrated in Figure 2 with cover plates omitted to expose operating mechanism and showing the heads at the left retracted and the remaining heads advanced;

Figure 3A is a section on the line 3A—3A, Figure 3.

Figure 4 is a section through one of the assembly slides, taken on the line 4—4, Figure 3, showing the heads advanced;

Figure 4A is a fragmentary side elevation partly in section of a different one of the assembly slides showing an alternative method of pressure control;

Figure 4B is an enlarged section on the line 4B—4B, Figure 3, showing the head advanced.

Figure 5 is a rear elevation of the assembly slide seen in Figure 4, the view including a portion of the supporting frame;

Figure 6 is a section on the line 6—6, Figure 4;

Figure 7 is a fragmentary plan view partly in section of one of the assembly slides;

Figure 8 is a diagrammatic view illustrating certain operations of the machine in the assembly of bars into frame structure;

Figure 9 is a simplified wiring and piping diagram of the improved machine.

Figure 10 is an end view of the upsetting ram; and

Figure 11 is a fragmentary section on the line 11—11 of Figure 10.

Figure 1:
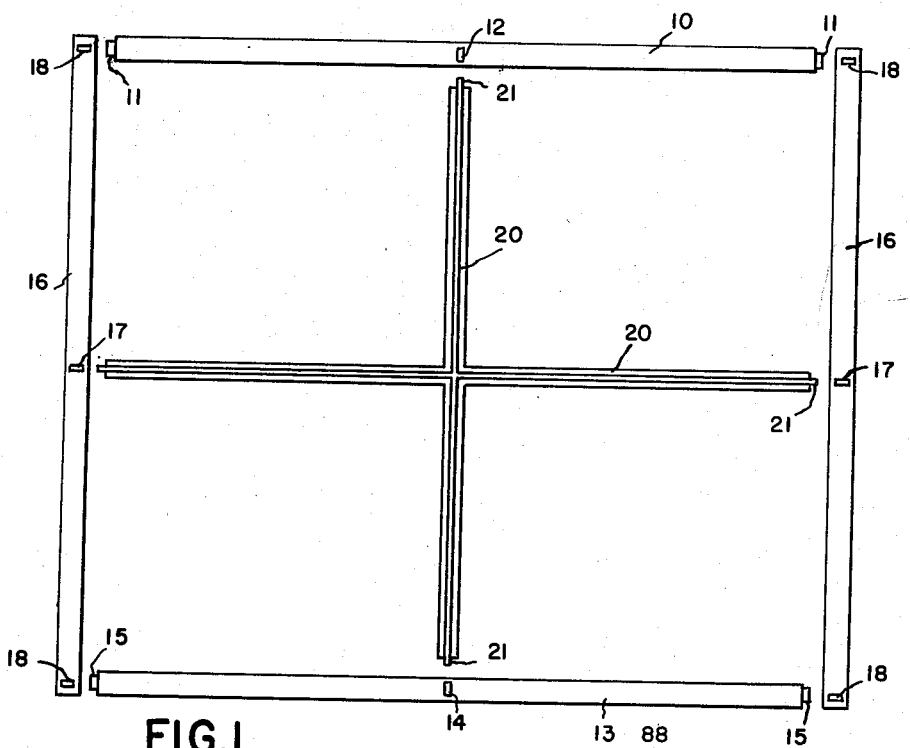
Figure 1 is an exploded view of a plurality of bar elements to be assembled into a typical frame, the border elements being tipped outwardly through 90° to show the formation of tenons and tenon-receiving slots therein.
Figure 2:
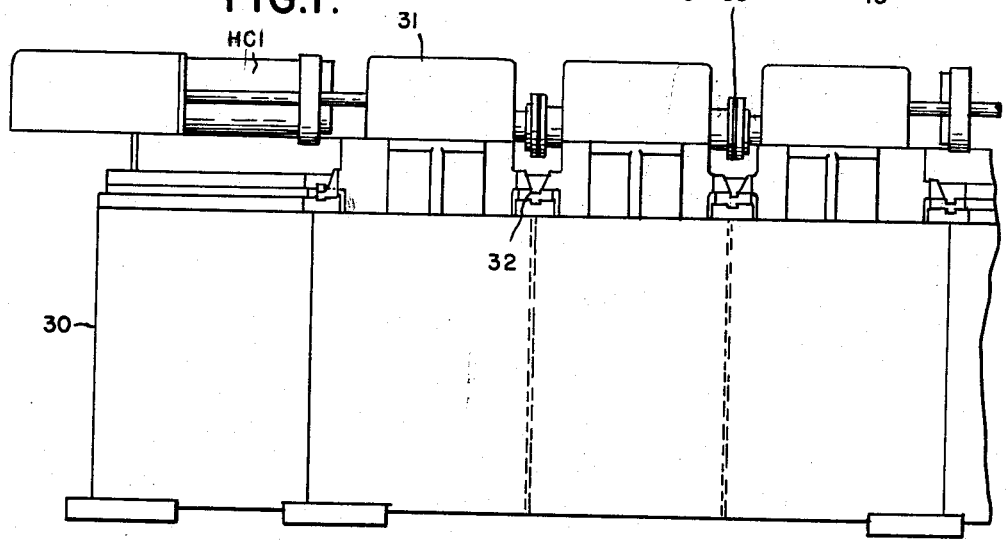
Figure 2 is a side elevation of apparatus for assembling the bars illustrated in Figure 1 into a frame assembly.

Referring first to Figure 1, there is illustrated a head bar 10 having tenons 11 at opposite ends thereof and provided centrally with a tenon-receiving opening or slot 12. A sill bar 13 which may be identical with the head bar 10 is provided, the sill bar having a central tenon-receiving slot 14 and tenons 15 at the ends thereof. Jam bars 16, which may be identical, are provided, each of which has a central tenon-receiving slot 17 centrally thereof and tenon-receiving slots 18 adjacent opposite ends thereof. In the particular pattern of frame selected for purposes of illustration, the window is provided with muntin bars 20 preassembled in the form of a cross, each of these bars having tenons 1 at the ends thereof. In Figure 1 the head bar 10, sill bar 13 and jam bars 16 are rotated outwardly through 90° from their assembled relation to best illustrate the coaction between the various tenons and tenon-receiving slots.

The present pattern of frame has been selected for purposes of illustration since it involves two separate advancing and upsetting or riveting operations. As will be apparent, the head bar 10 and the sill bar 13 may be advanced inwardly so as to cause the tenons 21 to pass through and protrude from the slots 12 and 14 respectively. This operation will have the effect of aligning tenons 11 and 15 with the slots 18 punched or pierced in the jam bars 16. Thereafter the jam bars 16 may be moved inwardly assembling tenons 11, 21 and 15 with the slots 18, 17 and 18, respectively.

Referring now to Figures 2 through 7, the apparatus comprises a platform or table 30 which supports a plurality of assembly slides 31. Each of the slides 31 is mounted for longitudinal inward and outward movement on ways 32. The number and arrangement of slides 31 will of course depend upon the particular pattern of frame to be assembled. However, in the present instance assembly slide 31h is adapted to carry and operate upon the head bar 10, assembly slide 31s is adapted to carry and operate upon sill bar 13 and slides 31j are assembled in groups of three, each group being adapted to carry and operate upon one of the jam bars 16. Slides 31j are rigidly interconnected for simultaneous sliding movement by struts 33.

Hydraulic means illustrated in Figure 4 are provided for effecting sliding movements of the several slides. As seen in this figure, a slide cylinder SC is mounted on the slide 31 and is provided with a stationary piston attached to the base 30. The piston and cylinder are interconnected between the frame and the assembly slide such that upon relative movement between the piston and cylinder the assembly slide is advanced or retracted with respect to the bars being assembled. In the illustrated apparatus four slide cylinders SC are provided, one of which is effective to operate the slide 31h, another of which is effective to operate the slide 31s, the remaining two being effective to operate respectively one of the three groups of slides 31j. Thus, for example, one of the slide cylinders SC may be connected directly to the intermediate assembly slide 31j and will operate the two adjacent assembly slides through the medium of the rigid interconnecting struts 33 previously referred to.

As best illustrated in Figures 4 through 7, each of the assembly slides 31 comprises a supporting block 40 carrying an anvil 41 shaped to receive and support the tenon ends of one of the bars. Preferably the anvil is shaped to interfit with the cross-sectional shape of the particular bar being operated upon. In order to support the tenon end of the bar during the upsetting operation of the tenon, at which time relatively great pressures are applied to the tenon, clamping jaws 42 are provided. The jaws 42, as illustrated in Figure 6, are supported for rocking movement about a pivot axis determined by the axis of supporting shafts 43 and adjacent their lower ends are provided with cam-engaging rollers 44 engageable with a vertically movable cam 45 actuated by a hydraulic piston and cylinder mechanism illustrated generally at CC. Shafts 43 adjacent their outer ends are provided with lever arms 50 interconnected by a tension spring 51 urging the clamping jaws 42 outwardly away from the frame bar, which in Figure 6 is illustrated as one of the muntin bars 20. Attention is directed at this time to the fact that as the jaws 42 move into engagement with the frame bar 20 they are moving generally inwardly with respect to each other but in addition have a slight downward component of motion which results in clamping the frame bar 20 firmly against the anvil 40. As best seen in Figures 4, 6 and 7 the clamping jaws 42 are movable inwardly and outwardly and have sliding engagement with rigid abutments 55 mounted on the slide which are adapted to take up thrusts longitudinal of the bars 20 during the upsetting of the tenons thereon. Preferably the bar-engaging faces of the jaws 42 are serrated or otherwise modified to provide rigid interlock when brought into pressure contact with opposing faces of the web of the bar.

Each of the assembly slides 31 comprises a longitudinally movable assembly head which is indicated generally at 60 in Figures 4 and 7. The assembly head is made up of a backing plate 61, a pressure plate 62 and an upsetting ram 63 carrying a chisel 63a. The head is adapted to be moved relative to the assembly slide by means of a piston rod 64 projecting forwardly from a hydraulic cylinder 65. A pair of guide bars 66 are provided extending forwardly through the backing plate 61 and into guiding recesses formed at the rear of the pressure plate 62. Relatively strong compression springs 70 are located intermediate the backing plate 61 and the pressure plate 62, suitable recesses being formed in the confronting faces of these plates. Stop bolts 71 which are threaded into the rear surface of the pressure plate 62 extend outwardly through openings in the backing plate 61, and the heads of the bolts 71 serve to limit movement of the pressure plate 62 outwardly with respect to the backing plate 61.

Both the backing plate 61 and the ram 63 are rigidly connected to the forward end of the piston rod 64, as well illustrated in Figure 7.

Referring now to Figures 4 and 4B, clamping or hold-down means are provided for engaging a frame bar which in this figure is illustrated as a jam bar 16. The hold-down means comprises pins 75 movable through openings formed in the upper portion of the pressure plate 62. Pins 75 are rigidly secured to blocks 76 which carry downwardly depending rods 77 at the lower ends of which are mounted rollers 78 adapted to cooperate with fixed cams 79 rigidly mounted on the assembly slide 31. Cams 79 have inclined portions beneath which the rollers 78 engage during the forward movement of the head 60 so that the bar 16 is firmly clamped against a supporting ledge 80 prior to passage of one of the tenons 21 through the slot 17 formed in the bar 16.

Each of the heads 60 is provided with an independent piston 64a and cylinder 65 so that full hydraulic pressure will be available to upset each of the projecting ends of the tenons. Inasmuch as there may be some variation in the final shortening of the various upset tenons it is apparent that there may be a slight difference in the forward position of the several rams 63 in each of the groups of associated slides, such for example as the three jam assembly slides 31j. However, it is desirable that forward movement of the several heads shall be parallel and at the same rate. In order to accomplish this purpose each of the pistons is provided with a rack 85 meshing with a pinion 86, the pinions being connected with coaxial shaft sections 87. Adjacent shaft sections 87 are interconnected by a friction clutch 88. The friction clutch best illustrated in Figure 3A consists of a pair of plates 88a each keyed to adjacent shaft sections 87. Attached to each plate are facings of friction material 88b. A spring 88c maintains the plates in frictional contact, the plate adjacent the spring having a sliding fit on its shaft section 87 to allow for a slight longitudinal movement on the shaft. Referring to Figure 3 the group of three heads at the left of the figure is shown in a retracted position. In this position the jamb bar 16 is loosely held in position by the three heads 60 as the holding pins 75 have not come into action. When a relatively low hydraulic pressure is applied to the separate cylinders 65 the heads advance in unison because of their interconnection through the coaxial shafts 87 and clutches 88. The bar 16 is thus advanced without becoming misaligned until the hold-down pins 75 come into action as a result of engagement between rollers 78 and cams 79 and the bar becomes assembled with the other frame bars. A relatively high hydraulic pressure is then applied to the cylinders causing the chisels of the rams 63 to upset the tenons. During this operation the rams act independent of each other as the pressures exerted in the cylinders are greater than the frictional resistance of the clutches, causing them to slip. This action is necessary to make proper upsets due to variations in hardness of material and length of tenons. When the heads return to the retracted position they re-align themselves by the high hydraulic pressure that is exerted on the piston to force the pistons to be stopped at the cylinder end walls.

As best seen in Figure 4, which illustrates the head 60 in its position of furthest advance, the jaws 42 overlie the rebate 90 on the bar 16. Also, it will be observed that the pressure plate 62 has a portion including the hold-down pins 75 overlying the flange on the bar 16. Accordingly, in order to clear the bar elements of the frame for withdrawal it is necessary for the head 60 to be withdrawn to the left as seen in this figure and the entire assembly slide 31 moved to the right sufficient to permit jaws 42 to clear the rebate 90. Conversely, when the bars are initially assembled in the machine it is necessary for the assembly slide 31 to move outwardly with respect to the frame to bring the ends of the jaws 42 closely adjacent to the tenon ends of the bars, which results in bringing the jaws into overlying relationship with respect to laterally projecting elements such as the rebates 90.

In operating the apparatus it is necessary only for the operator to place the bars in proper position in the heads 60. In order to assure proper alignment, at least one head on each side of the apparatus is provided with a locating pin 95 carried by a pressure plate 62 and the bars are provided with accurately spaced openings for receiving the locating pins. The pins 95 thereby prevent longitudinal displacement of the bars. Any misalignment between tenons and slots in a vertical plane is prevented in part by the hold-down clamps 75 and in part by the jaws 42 which accurately position the tenon ends with respect to the slots in the cooperating bars.

The operation of the apparatus is fully automatic and for this purpose it is provided with certain switches, relays and mechanically operated valves which will be described completely in connection with the wiring and piping diagram illustrated in Figure 9. Before proceeding to a description of Figure 9, however, attention is directed to the physical location of certain of these elements. In Figure 7 there is illustrated a micro-switch MS2 which is adapted to be actuated by a camming projection 95a movable with the piston rod 64.

Also seen in Figure 4 is a micro-switch MS1 carried by a bracket 96 secured to the frame 30. It may be noted that in the illustrated embodiment the slide cylinder SC is carried by the slide 31 and is movable therewith with respect to a fixed piston carried by the frame of the machine. A cam 97 is mounted for movement with the movable slide 31 and is adapted to actuate a switch button 98 of micro-switch MS1.

As seen in Figure 4A, which is a side elevation partly in section of a different one of the assembly slides 31, there is provided an element 100 movable with a piston identical with the piston 64 illustrated in Figure 4 which actuates the head. The element 100 is provided with a cam 101 adapted to engage a roller 102 carried by a shut-off valve SO1. It may be mentioned in passing that the cam 101 operates the shut-off valve SO1 mechanically, whereas micro-switch MS2 which is operated by movement of the piston rod 64 performs the same function for the shut-off valve SO2 except that it is accomplished by means of a relay energized by actuation of micro-switch MS2.

Referring now to Figure 8, there is a diagrammatic illustration of the machine together with the sequence of steps performed thereby. The assembly slides 31 are designated by the ovals, the clamping jaws 42 are designated by the U-shaped elements and the movable heads 60 are designated by the elongated cross. The machine is diagrammatically illustrated as assembling the head bar 10, the sill bar 13, the jam bars 16 and the intermediate muntin cross bars 20. The head bar 10 is mounted on the head 60h, the sill bar 13 is mounted on the head 60s and the jam bars 16 are each mounted upon three heads 60j. The first operation of the machine comprises an outward movement of all slides, as indicated by the arrow designated A. The next succeeding operation is the clamping by the jaws 42 of the four tenon ends of the muntin bars 20 and this motion is designated by the arrows B. Following this the tenons at the ends of the muntin bars 20 are assembled with corresponding slots in the head and sill bars 10 and 13, this being accomplished by inward motion of the heads 60h and 60s, which motion is indicated by the arrow C. This has the effect of bringing the tenon ends of the head and sill bars into proper relationship with respect to the slots formed at the ends of the sill bars 13. The next operation of the machine is clamping movement of the four pairs of jaws 42 to engage the tenon ends of the head and sill bars 10 and 13, which motion is designated by the arrows D. The next motion of the machine assembles the jam bars and is accomplished by inward motion of the six heads 60j, this motion being designated by the arrow E. Completion of the inward motion of the heads 60j not only assembles the tenon ends of the bars with slots formed in the jam bars but also upsets the protruding portion of the tenons. The next motion of the machine is a general releasing motion which includes release of all eight clamping jaws 42, this motion being indicated by the arrows designated F. Simultaneously with this releasing motion of the clamping jaws there is a return or withdrawing movement of the several heads 60h, 60s and 60j, this motion being designated by the arrow G. Upon completion of release of the clamps 42 and return of the several heads, the final motion in the cycle is an inward motion of all of the eight slides 31, this motion being designated by the arrow H. Inward movement of the several slides 31 releases the completely assembled frame for withdrawal and leaves the elements of the apparatus in position to receive the bars for assembly into the next frame structure.

Referring now to Figure 9, there is illustrated a piping and wiring diagram. The motions of the apparatus are obtained from hydraulic cylinders and in order to supply hydraulic fluid the apparatus includes an electric motor M operating a combination pump P. The pump is of the type which is adapted to supply a large volume of fluid at a relatively low pressure or a small volume of fluid at a relatively high pressure. The pump is adapted to shift automatically from large volume, low pressure operation to small volume, high pressure operation when the back pressure on the pump discharge line exceeds a predetermined value. Pumps of this type are well known and may be purchased in the open market.

Normally open starting switch SS1 is momentarily closed, passing current through the coils of the timers T1 and T2. Energization of the coil of the timer T2 closes its contacts, thus completing a circuit through holding current relay CR1, thus closing normally open contacts of the switches S1 and S2. Switch SS2 controls a normally closed switch through which line current is supplied through switch S2 to current relay CR1 and therefore when the starting button is released switches S1 and S2 remain closed so long as the timer T2 maintains its contacts closed.

Closure of the switch S1 energizes reversing valve RV1 to admit hydraulic fluid to the slide cylinders SC1, SC2, SC3 and SC4 to cause all of the slides at all four sides of the machine to move outwardly. As these slides reach their outermost position micro-switches MS1, which are illustrated as in series, are closed and upon closure of the last micro-switch MS1 a circuit is established to the relay CR2 to close normally open switch S3, thus energizing reversing valve RV2 to pass hydraulic fluid to the four clamping cylinders CC1 which control the clamping jaws located inside the outer frame members. As the jaws close upon the outer ends of the inner cross members, pressure in the hydraulic system builds up and eventually exceeds a predetermined pressure set upon a sequence valve SV1. Thereafter fluid is admitted under the large volume, low pressure operation of the pump to the head cylinders HC1, thus advancing the two heads which carry out the first assembling and upsetting operation. As the heads are moved forward by operation of the head cylinders HC1, shut-off valves SO1 are operated to close and thereafter escape of fluid from the cylinders HC1 is through the adjustable needle valves NV1. This immediately restricts the flow of fluid, thus building up pressure in the system, and the pump automatically shifts from large volume, low pressure to small volume, high pressure operation. It will be appreciated that this high pressure is effective not only on the head cylinders HC1 but also upon the clamping cylinders CC1. Closure of the shut-off valves SO1 takes place just prior to commencement of the upsetting operation so that as the upsetting operation is carried out by final forward movement of the upsetting rams, this movement is carried out at the high hydraulic pressure and at the same time the same high pressure is available to insure rigidity of the ends of the tenon bars as the protruding ends of the tenons are upset.

The foregoing portion of the cycle takes place in a definite interval of time and just after it is completed the timer T1 is arranged to time out to close its contacts, thereby energizing relay CR3 to close the contacts of switch S4 and hence to actuate reversing valve RV3 to admit fluid to clamping cylinders CC2. Opening of the hydraulic lines to these cylinders immediately drops the pressure in the system and the pump returns to its large volume, low pressure operation. The second half of the cycle is similar to the first. The remaining clamping jaws are closed upon the tenon ends of the bars after which pressure builds up in the system and opens sequence valve SV2 to supply fluid under pressure to head cylinders HC2. Forward movement of the head cylinders HC2, just prior to initiation of the upsetting operation by the rams carried thereby, closes micro-switches MS2, thereby energizing relay CR4 and operating to close shut-off valve SO2. Thus instead of employing mechanical means to operate the shut-off valves as was done in connection with shut-off valves SO1, in this case electrical means are employed. However, the operation is the same in that closure of the shut-off valve SO2 causes the outlet flow of fluid from cylinders HC2 to by-pass through adjustable needle valves NV2, thus immediately establishing high pressure in the system and causing the pump to shift against its high pressure operation. Therefore high pressure will be available in the system at this time not only to effect final upsetting movement of the rams actuated by the head cylinders HC2 but also to insure positive gripping of the tenon ends of the bars remaining to be assembled.

The timer T2 is set to time out shortly after completion of the final upsetting operation and as the timer T2 times out and opens its contacts relay CR1 is deenergized and switches S1 and S2 open. Therefore the various reversing valves RV1, RV2 and RV3 reverse. However, an additional sequence valve SV3 is placed between the reversing valve RV1 and the several slide cylinders SC1, SC2, SC3 and SC4 so that fluid will not pass therethrough until pressure in the system builds up to the predetermined setting of the sequence valve SV3. Therefore fluid flows through the reverse valves RV2 and RV3 to the clamping cylinders CC1 and CC2 and to the head cylinders HC1 and HC2. As the pistons in these cylinders reach their limiting position pressure in the system builds up and surpasses the setting of the sequence valve SV3 and thereafter fluid is admitted to the slide cylinders SC1, SC2, SC3 and SC4 to move the slides inwardly to clear the finished frame.

During this automatic cycle current is supplied through the safety valve controlled by the switch SS2. If at any time during the cycle this switch is opened, relay CR1 is deenergized, switches S1 and S2 open and the various elements of the machine return to starting position.

While a complete apparatus for carrying out the operation in a fully automatic manner has been illustrated and described, it will be appreciated that certain features of the apparatus may be useful apart from the complete structure. Thus, for example, one of the assembly slides may be employed to form riveted or upset connection between two bars, one of which is provided with a tenon end and the other of which is provided with a slot for receiving the tenon. Instead of including the operation of automatic assembly the apparatus may be employed merely to upset the protruding end of a tenon if it has been manually inserted through a slot in a second bar, as will be readily apparent. The use of the clamping jaws for supporting the tenon end of a tenon bar directly adjacent the tenon represents an important function of the apparatus.

Referring again to Figure 3, there is indicated at 110 a plurality of elements which are adapted to be engaged at the four inner corners of the cross frame. If desired, these elements 110 may be operated by cam means or a hydraulic cylinder similar to the means for operating the clamping jaws 42 and will thus have the effect of accurately locating the center of the cross with respect to the border bars prior to the assembly between one of the cross bars and the border bars associated therewith. Without the use of movable clamping means such as the elements 110 the final positioning of the cross bars 20 is effected by inward movement of the heads 60, as will be readily apparent.

It has been found that improved results are obtained when the end of the ram or chisel 63 is serrated to provide a plurality of relatively sharp edges. This construction is illustrated in Figure 10 in which the sharp edges are indicated at 111. This construction provides for the concentration of pressure on the ends of the tenons along a plurality of lines and thus starts a flow of metal away from the concentration points. By employing the serrated ends on the ram 63 entirely satisfactory results may be obtained with much less pressure applied to the rams than would be the case if the ends of the rams were smooth.

While the embodiment of the present invention selected for illustration and complete description is intended to assemble a frame comprising four outside border pieces and an interior cross of muntin bars, it will be understood that the apparatus is extremely flexible in use and may be set up to assemble frames which differ widely in size, shape, number and arrangement of interior bars. Each of the assembly slides is a complete operating unit requiring only suitable connection to controlled sources of hydraulic pressure and each may operate completely independently of any other slide. Obviously, for most rapid production the maximum number of slides will be arranged to operate simultaneously but essentially the operation of each slide is independent of the operation of any other slide. Fundamentally each slide performs a single operation of assembling a slotted bar over a bar having a tenon end and upsetting the tenon to effect a firm and permanent interconnection between the bars.

While the illustrated embodiment of the present invention employs hydraulic power and certain electrical controls, it will be understood that the invention is not so limited and instead electrical or mechanical actuating means may be employed and the control means may be mechanical, electrical or hydraulic, as desired.

The drawings and the foregoing specification constitute a description of the improved machine for making frames in such full, clear, concise and exact terms as to enable any person skilled in the art to practice the invention, the scope of which is indicated by the appended claims.

What we claim as our invention is:

1. A sash assembly machine comprising a frame, locator means on said frame for locating a tenon bar having a tenon at one end against longitudinal movement, a pair of jaws on said frame movable transversely of the tenon bar to grip the tenon bar closely adjacent to its tenon end, a head movable on said frame longitudinally of said bar, said head comprising a support for carrying a slotted bar perpendicular to the tenon bar with a slot therein aligned with the tenon of the tenon bar, a hold-down clamp on said support for pressing the slotted bar firmly against said support, said head also comprising an upsetting ram, and means on said head mounting said support for movement toward and away from said ram.

2. A machine as defined in claim 1 which comprises actuating means operably connected to said hold-down clamp operable in response to advance of said head for moving said clamp toward said support to clamp the slotted bar against said support.

3. A sash assembly machine comprising a frame, means on said frame for supporting a tenon bar having a tenon at one end against longitudinal movement, a head movable on said frame longitudinally of the tenon bar, said head comprising a rigid backing plate, a rigid upsetting ram projecting forwardly therefrom and a bar supporting pressure plate movable relative to said backing plate and normally spaced forwardly from said backing plate for supporting a slotted bar, guide means providing for relative movement between said pressure plate and said backing plate and ram, resilient means urging said pressure plate forwardly from said backing plate and ram, a hold-down clamp movable relative to said pressure plate and effective to clamp the slotted bar firmly against said pressure plate, power means for advancing said head to cause the tenon to pass through the slot, camming means comprising a cam surface on said frame and a cam follower connected to said clamp operable during advance of said head to move said clamp to clamping position, said power means being effective thereafter, to cause further advance of said ram to upset the protruding end of the tenon.

4. Apparatus for assembling and interlocking a bar having a plurality of slots therein with a plurality of bars having end tenons adapted to enter the slots, comprising a frame, pairs of jaws on said frame corresponding in number to the number of slots and tenons adapted to grip the tenon ends of the bars, heads on said frame for movement toward and away from said pairs of jaws, said heads comprising supports for engaging the slotted bar adjacent the slots therein, said heads also comprising rams movable toward said jaws to upset the protruding ends of the tenons, said supports being movably mounted on said heads to carry the slotted bar ahead of said rams whereby advance of said supports is stopped by engagement between the slotted bar and the ends of the bars having tenons at their ends, hydraulic means for advancing said heads, a rack movable with each of said heads, a pinion meshing with each of said racks, coaxial shaft sections secured to said pinions, and friction clutches interconnecting adjacent shaft sections.

5. In a machine for assembling sash, a plurality of pistons, upsetting rams actuated by said pistons, means including coaxial shafts connecting said rams for effecting synchronous movement thereof, and friction clutches joining said shafts operable to permit relative rotational movement therebetween.

6. In a machine for assembling sash, a base, a plurality of heads on the base, a piston coacting with each head, means connecting adjacent heads for movement in parallel paths in unison under a predetermined relative low pressure and other means adapted to disconnect the connecting means when a predetermined relative high pressure is applied to each of said pistons.

7. A machine for assembling sash comprising a base, means on said base for locating and clamping bars having tenons, a plurality of pistons, a head actuated by each piston for sliding movement toward the end of each tenon bar, means including coaxial shafts connecting adjacent heads for synchronous movement, means on each head for locating and clamping a slotted bar portion, upsetting rams carried by each head, means including said pistons for advancing said heads to cause the tenons to pass through the slots of the bars and to upset the tenons, and means for disconnecting said coaxial shafts when a predetermined pressure is attained in said pistons during upsetting of the tenons.

8. A sash assembly machine comprising a frame, means on said frame for supporting a tenon bar having a tenon at one end against longitudinal movement, a pair of jaws on said frame movable transversely of the tenon bar to grip the tenon bar closely adjacent to its tenon end, a head movable on said frame longitudinally of said bar, said head comprising a support for carrying a slotted bar perpendicular to the tenon bar with a slot therein aligned with the tenon of the tenon bar, a locating member on said support receivable in an opening in a slotted bar carried thereby to prevent longitudinal movement of the bar on said support.

9. A sash assembly machine comprising a frame, means on said frame for supporting a tenon bar having a tenon at one end against longitudinal movement, a head movable on said frame longitudinally of the tenon bar, said head comprising a rigid backing plate, a rigid upsetting ram projecting forwardly therefrom and a bar supporting pressure plate movable relative to said backing plate and normally spaced forwardly from said backing plate for supporting a slotted bar, guide means providing for relative movement between said pressure plate and said backing plate and ram, resilient means urging said pressure plate forwardly from said backing plate and ram, and hydraulic means for advancing said head, means for applying a relatively low hydraulic pressure to said hydraulic means to advance said head to cause the tenon to pass through the slot, and means operable to apply a relatively high hydraulic pressure to said hydraulic means while said pressure plate is held stationary by engagement between the slotted bar with the end of the tenon bar, to cause further advance of said ram to upset the protruding end of the tenon.

10. A sash assembly machine comprising a frame, four slides on said frame movable on said frame in coplanar relation toward and away from a common center, pairs of clamping jaws on said slides, piston and cylinder power devices on said slides, heads slidably mounted on said slides for movement toward and away from the clamping jaws, said heads each comprising an upsetting ram rigidly connected to one of said power devices, said head also comprising a bar-carrying support movable with respect to said ram in the direction of movement of said head.

11. A sash assembly machine comprising a base, locator means on said base for locating a tenon bar having a tenon at one end, a pair of jaws on said base movable transversely of the tenon bar to grip the tenon bar closely adjacent to its tenon end, a head mounted on said base for movement longitudinally of the tenon bar, said head comprising an upsetting ram and a support adapted to carry a slotted bar in predetermined position perpendicular to the tenon bar with a slot therein aligned with the tenon of the tenon bar, said support being movable rearwardly on said head to provide for advance of said ram after forward movement of said support is arrested by engagement between the slotted bar and the tenon bar, and a power device mounted on said base and connected to said head to advance said head forwardly toward the tenon bar.

12. A machine as defined in claim 11 in which said power device comprises a piston and cylinder, and means for applying relatively low pressure to said cylinder to advance said head to assemble the bars, and to thereafter apply relatively high pressure to upset the tenon.

13. A machine as defined in claim 11 which comprises rigid abutment means on said base engaging the sides of said jaws opposite to said head.

14. A sash assembly machine comprising a frame, means on said frame for supporting a tenon bar having a tenon at one end against longitudinal movement, an anvil on said frame comprising a pair of jaws on said frame movable transversely of the tenon bar to grip the tenon bar closely adjacent to its tenon end, and a rest on said frame located adjacent to said jaws on which the tenon end of the tenon bar rests, means moving said jaws into clamping engagement with said bar and toward said rest to clamp the bar between said jaws and rest, a head movable on said frame longitudinally of said bar, said head comprising a support for carrying a slotted bar perpendicular to the tenon bar with a slot therein aligned with the tenon of the tenon bar, said head also comprising an upsetting ram, and means on said head mounting said second-mentioned support for movement toward and away from said ram.

15. A machine for assembling sash comprising a base, means on said base for locating and clamping bars having tenons, a plurality of piston and cylinder devices, a head actuated by each device for sliding movement toward the end of each tenon bar, synchronizing means connecting adjacent heads for synchronous parallel advance under relatively low pressure operation, each of said heads comprising means for locating and clamping a slotted portion of a single bar, each of said heads also comprising an upsetting ram, a control system comprising means for admitting hydraulic fluid under relatively low pressure to said devices to advance said heads in synchronism to cause the tenons to pass through the slots of the bar, said control system also comprising means thereafter to admit hydraulic fluid under relatively high pressure to advance said heads and upsetting rams to cause said rams to upset the ends of the tenons, said synchronizing means including mechanism operable under said relatively high pressure to provide for relative differential advance of said heads and rams.

16. Structure as defined in claim 15 in which said control system also comprises means effective after upsetting of the tenons to supply relatively low pressure hydraulic fluid in reverse direction to said devices to withdraw said heads and rams from the assembled sash, and means effective thereafter to apply relatively high pressure hydraulic fluid to said devices in said reverse direction to align said heads and rams for the next operation.

17. Structure as defined in claim 16 in which said synchronizing means comprises aligned shafts connecting said heads, and friction clutches effective to couple said shafts for synchronous rotation under said relatively low pressure condition but to slip to permit differential rotation between said shafts under relatively high pressure condition.

18. In a machine for assembling sash, a base, a plurality of heads on the base, a piston and cylinder device coacting with each head, guide means mounting adjacent heads for movement in parallel paths in unison under a predetermined relative low pressure applied to said devices, synchronizing means comprising a rack and pinion set operatively connected to each head disposed with said racks parallel to the direction of movement of said heads, aligned shafts supporting said pinions, and means coupling said shafts for synchronous rotation under relatively low pressure applied to said devices and operable to provide for differential rotation between said shafts when relatively high pressure is applied to said devices.

19. A sash assembly machine operable to assemble and interlock two opposed pairs of sash border bars with crossed muntin bars into a rectangular sash, said bars having interfitting slots and tenons, said machine comprising a base, locating means on said base for holding the crossed muntin bars in accurately located position, a first pair of opposed bar supporting heads movable on said base toward and away from said locator means and each other, a second pair of opposed bar supporting heads movable on said frame toward and away from said locator means and each other in a direction at right angles to the path of movement of said first pair of bar supporting heads, each of said heads comprising a tenon-upsetting ram rigidly connected thereto, and a bar support yieldably carried thereby, means for simultaneously moving the first pair of heads toward each other to assemble an opposed pair of border bars with the muntin bars and to cause said rams to upset tenons projected through slots in the pair of border bars, and means for thereafter simultaneously moving the remaining pair of heads toward each other to assemble the remaining pair of bars with the muntin bars and first pair of bars and to upset tenons projected through slots in the second pair of border bars.

20. In a sash assembly machine, a base, a tenon bar support on said base for supporting a tenon bar having a tenon at one end against longitudinal movement, a head movable on said base forwardly and rearwardly toward and away from the tenon bar along a path in alignment with the tenon bar, said head comprising a ram rigidly connected thereto and a slotted bar support for carrying a slotted bar perpendicular to the tenon bar with a slot therein aligned with the tenon of the tenon bar, means on said head mounting said slotted bar support for movement relative thereto in a direction parallel to the path of movement of said head, resilient means urging said slotted bar support forwardly from said head toward said tenon bar support, said resilient means being yieldable after the tenon of said tenon bar has entered the slot of said slotted bar to provide for further advance of said head and ram, said ram being in alignment with the tenon to upset the tenon by continued advance of said head, and power means connected to said head for advancing said head to sequentially assemble said bars and to upset said tenon.

BERT E. ROCKHOFF.
JOSEPH MAYER.

References Cited in the file of this patent

UNITED STATES PATENTS

| Number | Name | Date |
|---|---|---|
| 523,393 | Baum | July 24, 1894 |
| 774,810 | Willis | Nov. 15, 1904 |
| 1,129,920 | Thompson | Mar. 2, 1915 |
| 1,166,711 | Osborne | Jan. 4, 1916 |
| 1,275,576 | Lockwood | Aug. 13, 1918 |
| 1,445,664 | Brogden | Feb. 20, 1923 |
| 1,469,864 | Way | Oct. 9, 1923 |
| 1,511,822 | Belcher | Oct. 14, 1924 |
| 1,684,932 | Weatherhead | Sept. 18, 1928 |
| 1,883,906 | Hasselquist | Oct. 25, 1932 |
| 1,954,545 | Uline | Apr. 10, 1934 |
| 2,350,875 | Carney | June 6, 1944 |